United States Patent [19]
Tajima et al.

[11] Patent Number: 5,854,324
[45] Date of Patent: Dec. 29, 1998

[54] POLYACETAL RESIN COMPOSITION

[75] Inventors: Yoshihisa Tajima, Shimizu; Hiroyuki Sano, Mishima; Katsunori Takayama, Fuji, all of Japan

[73] Assignee: Polyplastics Co., Ltd., Japan

[21] Appl. No.: 913,873

[22] PCT Filed: Apr. 24, 1996

[86] PCT No.: PCT/JP96/01109

§ 371 Date: Sep. 24, 1997

§ 102(e) Date: Sep. 24, 1997

[87] PCT Pub. No.: WO96/34054

PCT Pub. Date: Oct. 31, 1996

[30] Foreign Application Priority Data

Apr. 24, 1995 [JP] Japan ........................................ 7-98370

[51] Int. Cl.$^6$ ...................................................... C08L 59/00
[52] U.S. Cl. .......................... 524/232; 524/230; 524/243; 524/268; 524/315; 524/318; 524/512; 525/64; 525/101; 525/154; 525/405
[58] Field of Search .............................. 525/154, 64, 405, 525/101; 524/230, 232, 243, 268, 315, 318, 512

[56] References Cited

U.S. PATENT DOCUMENTS 5,344,875 9/1994 Niino ........................................ 525/64
5,346,737 9/1994 Takahashi .............................. 525/154
5,559,180 9/1996 Takahashi .............................. 525/154

FOREIGN PATENT DOCUMENTS

| 0 124 955 | 11/1984 | European Pat. Off. . |
| 0 618 262 A1 | 10/1994 | European Pat. Off. . |
| 0 624 624 A1 | 11/1994 | European Pat. Off. . |
| 0 632 097 A1 | 1/1995 | European Pat. Off. . |
| 3-70764 A | 3/1991 | Japan . |
| 4-351647 A | 12/1992 | Japan . |
| 6-240106 A | 8/1994 | Japan . |
| 8-12848 A | 1/1996 | Japan . |

*Primary Examiner*—Patricia A. Short
*Attorney, Agent, or Firm*—Nixon & Vanderhye, PC

[57] ABSTRACT

A polyacetal resin composition having excellent friction resistance and abrasion resistance performances is provided by improving the compatibility, dispersibility and interfacial adhesiveness between the polyacetal resin and an olefinic polymer.

To a polyacetal resin (A), 1 to 100 parts by weight based on 100 parts by weight of the resin (A) of a modified olefinic polymer (B) modified with at least one member selected from the group consisting of an unsaturated carboxylic acid and an acid anhydride thereof, and their derivatives, and 0.1 to 100% by weight based on component (B) of an alkylene glycol polyme (C)r having a primary or secondary amino group(s) and having a number-average molecular weight of 400 to 500,000 are blended.

14 Claims, No Drawings

POLYACETAL RESIN COMPOSITION

[FIELD OF INDUSTRIAL APPLICATION]

The present invention relates to a polyacetal resin composition having excellent friction resistance and abrasion resistance performances by improving the compatibility, dispersibility and interfacial adhesiveness between resins, which is obtained by blending a polyacetal resin with a specific olefinic polymer and an alkylene glycol polymer having a primary or secondary amino group optionally together with, further, a lubricant if required, and melting and kneading.

[PRIOR ARTS]

Polyacetal resins have widely been used in some fields such as automobiles, and electrical and electronic appliances since they have well-balanced mechanical properties, and are excellent in, e.g., friction resistance and abrasion resistance performances, chemical resistance, heat resistance and electrical characteristics. However, the performances required in such fields are gradually escalating, and, as one example, there has been desired to further improve the sliding performances, as well as general physical properties. Although such sliding performances include, of course, the friction coefficient and the specific abrasiveness, the sliding performances under a high surface pressure have particularly been considered as important ones.

Generally, addition of a fluororesin or a polyolefinic resin, or addition of a lubricant such as fatty acids, fatty acid esters, silicones and various mineral oils, to polyacetal resins is effected for the purpose of the improvement of the sliding performances.

The addition of a fluororesin or a polyolefinic resin improves the sliding performances to a certain extent. However, since these resins exhibit poor compatibility with polyacetal resins, the resin compositions obtained have unsatisfactory sliding performances under a high surface pressure, and they are liable to cause peeling on the surfaces of molded articles or to form a deposition on a mold.

While, the addition of a lubricant has various disadvantages such as the trouble of the processing in extrusion or molding, or the bleeding during using.

Thus, known conventional methods are not enough from the view points of the sliding performances, molding processability and other practical behaviors, and materials improved in such various properties have been desired.

[SUMMARY OF THE INVENTION]

The present inventors have extensively investigated to attain the above object, and, as a result, have found that a resin composition having excellent sliding performances as well as excellent general physical properties and surfaces of molded articles can be obtained by blending a polyacetal resin with a modified olefinic polymer modified with at least one member selected from the group consisting of an unsaturated carboxylic acid and an acid anhydride thereof, and their derivatives, and an alkylene glycol polymer having a primary or secondary amino group(s) and having a specific molecular weight, and melting and kneading them, since the dispersability between resin components is remarkably improved, thus completed the present invention.

Thus, the present invention provides a polyacetal resin composition prepared by melting a polyacetal resin (A), a modified olefinic polymer (B) modified with at least one member selected from the group consisting of an unsaturated carboxylic acid and an acid anhydride thereof, and their derivatives, and an alkylene glycol polymer (C) having a primary or secondary amino group(s) and having a number-average molecular weight of 400 to 500,000, and kneading them each other, wherein component (B) is contained in an amount of 1 to 100 parts by weight based on 100 parts by weight of component (A), and component (C) is contained in an amount of 0.1 to 100% by weight based on component (B); and a slide member comprising such the polyacetal resin composition.

Now, the present invention will be explained in detail.

[DETAILED DESCRIPTION OF THE INVENTION]

The polyacetal resin (A) used in the present invention may be any of a polyoxymethylene homopolymer which is a polymer having, as the main constitution unit, an oxymethylene group (—$CH_2O$—); and a copolymer, terpolymer or block copolymer having, as the main repeating unit, an oxymethylene group and containing, other than such a unit, a small quantity of other unit(s), e.g., a unit derived from a comonomer such as ethylene oxide, 1,3-dioxolane or 1,4-butanediol; or may be not only a linear one but also one having a branched or crosslinked structure in the molecule; or may be a known modified polyoxymethylene having other organic group(s) introduced. Also, the polymerization degree thereof is not particularly limited, and it may be one having a processability by melting and molding.

Preferable polyacetal resin is one having a melt index (ASTM D-1238-89E, hereinafter abbreviated as MI) of 1 to 50 g/10 minutes, and still more preferably one having a MI of 7 to 30 g/10 minutes.

Next, component (B) blended with the polyacetal resin in the present invention is a modified olefinic polymer prepared by modifying an olefinic polymer (b) with at least one member selected from the group consisting of an unsaturated carboxylic acid and an acid anhydride thereof, and their derivatives.

As the olefinic polymer (b) to be used herein, a homopolymer of an α-olefin such as ethylene, propylene, butene, hexene, octene, nonene, decene or dodecene; a random-, block- or graft-copolymer comprising two or more of these monomers; a random-, block- or graft-copolymer comprising these monomers and at least one member among comonomer components, for example, unconjugated diene components such as 1,4-hexadiene, dicyclopentadiene, 5-ethylidene-2- norbornene and 2,5-norbonadiene, conjugated diene components such as butadiene, isoprene and pyperylene, α,β-unsaturated acids such as acrylic acid and methacrylic acid, or their derivatives such as esters thereof, acrylonitrile, aromatic vinyl compounds such as styrene and α-methylstyrene, or vinyl esters such as vinyl acetate, vinyl ethers such as vinyl methyl ether, or derivatives of these vinyl compounds; and others are cited. The polymerization degree, the presence or absence, or the degree of side chains or branches, the composition ratio of the copolymer and the like have no limitation.

Examples of the olefinic polymer (b) in the present invention include polyethylenes produced by high-pressure process, polyethylenes produced by low or medium pressure process, ethylene-α-olefin copolymers which are produced by gas phase process, LLDPEs, polypropylenes, polybutenes, ethylene vinyl-acetate copolymers, ethylene methylacrylate copolymers, ethylene ethylacrylate copolymers, ethylene butylacrylate copolymers, ethylene-propylene copolymers, and ethylene-propylene-diene terpolymers. Preferables are polyethylenes, ethylene-methylacrylate copolymers, and ethylene-ethylacrylate copolymers.

The modified olefinic polymer (B) usable in the present invention is one prepared by modifying the above-mentioned olefinic polymer with at least one member selected from the group consisting of unsaturated carboxylic acids such as acrylic acid, methacrylic acid, maleic acid, citraconic acid, itaconic acid, tetrahydrophthalic acid, nadic acid, methylnadic acid and allylsuccinic acid; unsaturated carboxylic acid anhydrides such as maleic anhydride, citraconic anhydride, itaconic anhydride, tetrahydrophthalic anhydride, nadic anhydride, methylnadic anhydride and allylsuccinic anhydride; their derivatives; and other.

Preferable modified olefinic polymer is one having a MI of 0.01 to 10 0 g/10 minutes, still more preferably one having a MI of 0.1 to 50 g/10 minutes, and particularly preferably one having a MI of 0.2 to 30 g/10 minutes.

Specific examples of preferable modified olefinic polymers include polyethylenes, polypropylenes, ethylene-propylene copolymers and ethylene ethylacrylate copolymers which are modified with maleic anhydride.

As the modification method, for example, a method wherein the olefinic polymer is reacted with at least one compound selected from the group consisting of an unsaturated carboxylic acid and an acid anhydride thereof, and their derivatives in a solution or melted state in the presence of a radical initiator such as an organic peroxide under heating is preferable. However, the method is not particularly limited thereto. With respect to the amounts of both components to be blended, it is suitable that the above-mentioned compound is from 0.1 to 20 parts by weight, preferably 0.1 to 10 parts by weight based on 100 parts by weight of the olefinic polymer. When the effective amount of the compound in the olefinic polymer modified with such the compound is too small, the effects of the present invention can not be attained since the compatibility between the polyacetal resin (A) or component (C), and the modified olefinic polymer (B) is not satisfactorily improved, while when the amount is too large, the properties to be improved, such as sliding performances, may be adversely affected in some cases.

With respect to the blending ratio between the polyacetal resin (A) and the modified olefinic polymer (B), the modified olefinic polymer (B) is from 1 to 100 parts by weight, preferably from 1 to 50 parts by weight, and particularly preferably from 2 to 20 parts by weight, based on 100 parts by weight of polyacetal (A). When component (B) is insufficient, the physical properties which should be improved, such as sliding performances, are unsatisfactory. While when it is excess, the mechanical properties are adversely affected.

Next, the alkylene glycol polymer having a primary or secondary amino group(s) as component (C) is a polymer which is a homopolymer or a copolymer of ethylene glycol, propylene glycol or tetramethylene glycol, and has a primary or secondary amino group(s) at a terminal(s) or in the middle of the molecular chain. Polymers with a slight modification, e.g., further forming an ester with a fatty acid or an ether with an aliphatic alcohol can also be used. Examples thereof include polyethylene glycols, polypropylene glycols, polytetramethylene glycols, and copolymers comprising the constitution units of them, which have at least one aminopropyl group or aminooctyl group.

The number average molecular weight of the alkylene glycol polymer having a primary or secondary amino group (s) as component (C) is from 400 to 500,000, preferably from 400 to 100,000. This is because that when the molecular weight of component (C) is below 400, it impairs the mechanical properties and the sliding performances of the polyacetal resin (A) or the resin of component (B) as a high-molecular material, and that when it exceeds 500,000, the melt viscosity becomes so high as to be difficult to disperse it in the polyacetal resin, although the dispersibility of component (B) in the polyacetal resin is improved by the incorporation of component (C).

The amount of the alkylene glycol polymer having a primary or secondary amino group(s) as component (C) to be blended is from 0.1 to 100% by weight, preferably from 0.5 to 60% by weight, based on component (B). When component (C) is insufficient, the improvement effects can be unsatisfactorily obtained, while when it is excess, it unfavorably impairs the mechanical properties.

The characteristics and effects of the present invention are recognized in that the sliding performances, particularly under a high surface pressure, are remarkably improved by adding the modified olefinic polymer (B) and the alkylene glycol polymer (C) having a primary or secondary amino group(s) and having a specific molecular weight to the polyacetal resin (A), as mentioned above.

Although the composition of the present invention used as such exhibits excellent physical properties and excellent effects in, particularly, sliding performances, molding processability, etc., further enhanced effects can be obtained by using, further, lubricant (D) in addition to the above-mentioned components (A) to (C).

The lubricant as component (D) herein refers to, for example, mineral oils such as spindle oil, freezer oil, turbine oil, machine oil, cylinder oil and gear oil; hydrocarbons such as liquid paraffin, paraffin wax, polyethylene wax and α-olefin oligomers; fatty acids such as lauric acid, myristic acid, palmitic acid, stearic acid, isostearic acid, arachidic acid, behenic acid and montanic acid; aliphatic alcohols such as hexyl alcohol, octyl alcohol, nonyl alcohol, isotridecyl alcohol, cetyl alcohol, stearyl alcohol, isostearyl alcohol and behenyl alcohol; aliphatic esters composed of the above fatty acids and aliphatic alcohols, such as lauryl laurate, isotridecyl stearate, stearyl stearate and behenyl behenate; partial and/or full esters composed of the above fatty acids and polyhydric alcohols, e.g., glycols, glycerol, polyglycerols, trimethylol propane, pentaerythritol and sorbitol, such as ethylene glycol distearate, trimethylolpropane triisostearate, pentaerythritol tristearate, pentaerythritol tetrastearate, grycerol monostearate, glycerol di- and tristearate and glycerol monobehenate; esters of the above aliphatic alcohols with carboxylic acids, e.g., succinic acid, malonic acid, adipic acid, maleic acid, fumaric acid, phthalic acid and trimellitic acid, or with inorganic acids, e.g., boric acid and phosphoric acid, such as di(2-ethylhexyl)adipate, di(2-ethyl-hexyl) phthalate and tristearyl phosphate; fatty acid amides, etc, such as stearyl amide, palmityl amide, oleyl amide, methylene bis(stearoamide) and ethylene bis (stearoamide); amides of the above fatty acids with amine compounds, e.g., ammonia, ethylene diamine and hexamethylene diamine; metal soaps such as calcium stearate, zinc stearate and magnesium stearate; natural waxes such as montan wax; silicones and their derivatives such as poly (dimethylsiloxane)'s and poly(methylphenylsiloxane)'s; and substituted diphenyl ethers; and at least one member selected therefrom can be used. However, among such lubricants, lubricants comprising, as the base, at least one member selected from the group consisting of silicones, α-olefinic oligomers, paraffin, diphenyl ether, derivatives of fatty acids having 10 or more carbon atoms and derivatives of aliphatic alcohols having 10 or more carbon atoms can preferably be used from general standpoints of easiness of handling, processability, friction and abrasion resistances, mechanical properties and the like.

Now, such lubricants will be explained in detail.

As silicones, poly (dimethylsiloxane)'s and poly (methylphenylsiloxane)'s represented by the structure (1) are preferably used as representatives.

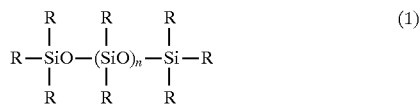

(wherein although R's are methyl groups, a part thereof may be, e.g., an alkyl group(s), a phenyl group(s), a halogenated alkyl group(s), a halogenated phenyl group(s), a group(s) derived from a polyalkylene glycol(s)).

Further, modified poly(organosiloxane)'s, which are prepared by substituting various substituents such as halogenated phenyl groups represented by chloro-phenyl group; alkyl groups having 8 or more carbon atoms; groups derived from polyalkylene glycols represented by polyethylene glycols; higher aliphatic acyloxy groups as derivatives of aliphatic carboxylic acids having 8 or more carbon atoms; and halogenated alkyl groups represented by trifluoromethyl group, for a part of the methyl groups in the poly (dimethylsiloxane), can also be used.

As such silicones, those having a kinematic viscosity (25° C.) in the range of 100 to 100,000 cSt are preferably used in the present invention.

The α-olefinic oligomer is an aliphatic hydrocarbon having mainly a structure that an α-olefin having 6 to 20 carbon atoms is polymerized or ethylene is copolymerized with an α-olefin having 3 to 20 carbon atoms. In the present invention, ethylene α-olefinic cooligomers having a number average molecular weight of 400 to 4,000 are preferably used.

The paraffin refers to the so-called paraffinic mineral oil which is mainly prepared by refining petroleum fraction. In the present invention, those having an average molecular weight in the range of 300 to 800 are preferably used.

The substituted diphenyl ether refers to compounds prepared by introducing at least one substituent selected from the group consisting of an alkyl group, an ester group and an acyl group which have 12 or more carbon atoms into the phenyl group(s) of the diphenyl ether, as shown in (2) below. There is no particular limitation for the molecular weight. Any of substituted diphenyl ethers is preferably used.

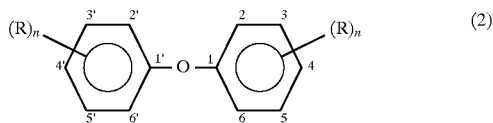

(wherein R ('s) is (are) an alkyl group(s), an ester group(s) or an acyl group(s) introduced into a part or all of the positions 2 to 6 and positions 2' to 6', and m and n are each an integer of 0 to 5, with the proviso that both m and n are not 0 simultaneously).

As alkyl groups as substituents of such substituted diphenyl ethers, linear alkyl groups such as dodecyl group, tetradecyl group, hexadecyl group and octadecyl group; branched chain alkyl groups represented by the following (3); and the like are cited.

(wherein m and n are each an integer of zero or more, with the proviso that m plus n is 11 or more).

While, as ester groups (QOCO— or QCOO—), dodecyloxy carbonyl group, tetradecyloxy carbonyl group, hexadecyloxy carbonyl group, octadecyloxy carbonyl group, lauroyloxy group, myristoyloxy group, palmitoyloxy group, stearoyloxy group and others are cited. Further, as acyl groups, lauroyl group, myristoyl group, palmitoyl group, stearoyl group and others are cited. Furthermore, there may also be such a group that the aliphatic hydrocarbon chain in such the ester groups and acyl groups has a branched structure, for example, one derived from isostearyl alcohol, isostearic acid or the like.

The effects of such substituted diphenyl ethers are not limited by the position of the substituent and any substituted diphenyl ether may be preferably used. From the standpoint of synthesis, however, preferables are substituted diphenyl ethers having a substituent(s) at a part or all of the positions 2, 4, 6, 2', 4', 6', and particularly preferables are one having two substituents at the positions of 4 and 4'.

The derivative of a fatty acid having 10 or more carbon atoms in the present invention is an ester of a fatty acid having 10 or more carbon atoms with a monohydric or polyhydric aliphatic and/or aromatic alcohol, or an amide of a fatty acid having 10 or more carbon atoms with a primary, secondary or tertiary amine.

As the fatty acids having 10 or more carbon atoms constituting the esters, saturated fatty acids, unsaturated fatty acids, linear fatty acids and branched fatty acids, such as lauric acid, tridecanoic acid, myristic acid, palmitic acid, stearic acid, isostearic acid, oleic acid, linoleic acid, linolenic acid, arachidonic acid, behenic acid, lignoceric acid, cerotic acid, montanic acid and melissic acid; and, further, derivatives of such fatty acids, such as 2-bromostearic acid, 18-bromostearic acid and 18-hydroxystearic acid are cited. Any of them is preferably used.

As the alcohols constituting the esters together with such the fatty acids, monohydric saturated and unsaturated aliphatic alcohols, linear and branched alcohols and the like, such as n-octyl alcohol, 2-ethylhexyl alcohol, isononyl alcohol, n-decyl alcohol, isodecyl alcohol, lauryl alcohol, myristyl alcohol, cetyl alcohol, 14-methylhexadecan-1-ol, stearyl alcohol, oleyl alcohol, 16-methylhexadecanol, 18-methylnonadecanol, 18-methylicosanol, docosanol, 20-methylheneicosanol, 20-methyldocosanol, tetracosanol, tetracosanol, hexacosanol and octacosanol, are cited. Any of them is preferably used.

Further, as the aromatic alcohols constituting such the esters, phenol, catechol, naphthol and the like are cited. Furthermore, as the aliphatic polyhydric alcohols, polyhydric alcohols such as ethylene glycol, propylene glycol, 1,4-butanediol, 1,5-pentanediol, 1,6-hexanediol, 1,2-octanediol, hexadecane-1,2-diol, octadecane-1,2-diol, icosane-1,2-diol, glycerol, trimethylolpropane, erythritol, pentaerythritol, sorbitol, 1,2-cyclononanediol and 1,2-cyclodecanediol; condensates of such the polyhydric alcohols, such as dipentaerythritol, tripentaerythritol, diethylene glycol, diglycerol, triglycerol, polyglycerol, polyethylene glycol and polypropylene glycol; partial esters of such the polyhydric alcohols with polybasic acids such as succinic acid and adipic acid; and others are cited. Any of them is preferably used.

Further, as the amides, amides of the above-described fatty acids having 10 or more carbon atoms with primary and secondary amines such as ammonia, ethylenediamine, tetramethylenediamine and monoethanolamine are cited. Any of them is preferably used. More specifically, palmitic acid amide, steartic acid amide, ethylene bis(stearic acid amide), tetramethylene bis(stearic acid amide) and the like are cited.

As the derivatives of the aliphatic alcohols having 10 or more carbon atoms in the present invention, esters of aliphatic alcohols having 10 or more carbon atoms with monohydric or polyhydric aliphatic and/or aromatic carboxylic acids are cited.

As the aliphatic alcohols having 10 or more carbon atoms constituting such the esters, saturated and unsaturated aliphatic alcohols, linear and branched alcohols and others, such as lauryl alcohol, myristyl alcohol, cetyl alcohol, 14-methylhexadecan-1-ol, stearyl alcohol, oleyl alcohol, 16-methylhexadecanol, 18-methylnonadecanol, 18-methylicosanol, docosanol, 20-methylheneicosanol, 20-methyldocosanol, tetracosanol, tetracosanol, hexacosanol and octacosanol, are cited. Any of them is preferably used.

As the fatty acids constituting the esters with such the alcohols, saturated fatty acids, unsaturated fatty acids, linear fatty acid and branched fatty acids, such as lauric acid, tridecanoic acid, myristic acid, palmitic acid, stearic acid, isostearic acid, oleic acid, linolic acid, linolenic acid, arachidonic acid, behenic acid, lignoceric acid, cerotic acid, montanic acid and melissic acid, and, further, derivatives of such fatty acids, such as 2-bromo-stearic acid, 18-bromostearic acid and 12-hydroxy-stearic acid, are cited. Any of them is preferably used.

While, as the aromatic carboxylic acids, benzoic acid, phthalic acid and the like are cited. As the aliphatic polybasic acids, those such as oxalic acid, malonic acid, succinic acid, glutaric acid, adipic acid, pimelic acid, suberic acid, azelaic acid, sebacic acid, 1,12-dodecamethylene dicarboxylic acid, 1,14-tetradecamethylene dicarboxylic acid, 1,16-hexadecamethylene dicarboxylic acid, 1,18-octadecamethylene dicarboxylic acid, trimellitic acid, maleic acid and fumaric acid, derivatives of such the polybasic acids, and others are cited. Any of them is preferably used.

Although any of the esters composed of the above-described carboxylic acids and alcohols are preferably used, the following esters are still more preferably used because of easier availability. That is, at least one member among esters, such as lauryl laurate, lauryl stearate, cetyl palmitate, isotridecyl stearate, oleyl oleate, stearyl stearate, isostearyl stearate, isostearyl isostearate, behenyl behenate, ethylene glycol distearate, glycerol monostearate, glycerol monobehenate, glycerol di- and tristearates, trimethylolpropane triisostearate, pentaerythritol tetraisostearate, pentaerythritol tetrastearate, polyethylene glycol dilaurate, polyethylene glycol distearate, diisotridecyl adipate and diisotridecyl phthalate, is(are) preferably used.

In the present invention, the amount of such the lubricant (D) added is from 0.1 to 20 parts by weight based on 100 weight parts of the sum total of components (A), (B) and (C). When it is less than 0.1. part by weight, the original effects of the lubricant (D) are difficultly exhibited. While when the amount is more than 20 parts by weight, on the contrary, the properties of the polyacetal resin (A) as the base are unfavorably impaired.

In addition, by using the lubricant (D) together with components (B) and (C), remarkable synergistic effects are exhibited, and remarkable effects are recognized in not only sliding performances but also general physical properties.

It is thought that one of reasons thereof is found that these component (B) and component (C) act as a carrier of the lubricant (D) and exhibit a intermediary function which brings forth an appropriate level of compatibility between component (A) and component (D). The lubricant (D) such as mineral oils and fatty acid esters have been used in general for the purpose of improving the sliding performances. However, it is difficult to incorporate the lubricant (D) singly into the polyacetal resin (A) uniformly in an enough amount for obtaining required sliding performances, and it causes the resin to slip over on a screw(s)of extruder during kneading, which causes troubles such as surging phenomenon and venting up of unmelted resin from a vent hole (s). Thus, not only the preparation itself of an uniform composition is difficult, but also troubles such as poor feeding and inferior plasticizing might occur in molding, and, further, for example, bleeding of the lubricant in a large amount on the surface of molded articles when used might occur.

On the contrary, when component (B) and component (C) are to be present, not only above-described disadvantages caused by use of the lubricant (D) alone are solved, but also remarkable synergistic effects are exhibited on sliding performances by the copresence of the lubricant (D), in particular, a fatty acid, an alcohol, a fatty acid ester or the like.

By adding, further, various types of known stabilizers, the stability of the composition of the present invention can be reinforced. Furthermore, various types of known additives can also be blended therewith for improving the physical properties depending on the use desired.

Examples of the additives include various kinds of colorants, mold release agents (other than the lubricants (D) described above), nuclear agents, antistatics, other surfactants, and different type polymers (other than the graft copolymers described above).

An inorganic, organic or metallic filler(s) in the form of fiber, granule or pellet may be used singly or a mixture of two of them, as long as it does not significantly deteriorate the desired performances of the composition of the present invention.

Next, the preparation of the composition of the present invention can be easily prepared by a known method commonly used as a conventional preparation method for resinous compositions. Any of methods, for example, a method wherein respective components are mixed one another at first, and then kneaded and extruded by a single-screw or twin-screw extruder to prepare pellets; and a method wherein pellets (master batches) having different compositions are prepared at first, and then predetermined amounts of the pellets are mixed (diluted) one another; can be employed.

Further, in the preparation of such the composition, it is a preferable method for improving the dispersability of the additive(s)that a part or all of the respective components are pulverized and mixed with other components, and then extrusion and other(s)are carried out.

Furthermore, when the lubricant (D), especially of liquid type, is used, the method wherein the lubricant (D) is preliminarily mixed with respective components to be impregnated thereinto, and then it is kneaded and extruded is also a preferable one in view of the easier preparation of the composition and the improvements of the processability and sliding performances.

[EXAMPLES]

The present invention is now explained more specifically by way of examples. However, the present invention is not limited by these examples.

The evaluation methods of various physical properties in the examples are as follows.

[Mechanical strength of molded specimen]

Tensile strength and elongation were determined in accordance with the method of ASTM D638.

[Test for peeling surface]

An adhesive tape was stuck on a surface of a specimen for tensile test, and the tape was separated instantaneously therefrom under a specific condition. The presence or absence of the peeling of surface of the specimen was judged with naked eyes.

[Weld elongation]

A specimen was prepared by molding a two-gates-mold having gates at both ends for forming a weld portion in the middle of the tensile specimen, and was determined in accordance with the method of ASTM D638.

[Test for friction and abrasion]

Test method (1) (against the same material)

Using Suzuki's Friction and Abrasion Tester (EFM-III-EN, manufactured by Orientech, Ltd.), a test was carried out against the member made of the same material as that of the specimen under the following slide condition. The dynamic friction coefficient and specific abrasiveness were determined after sliding for 24 hours.

Slide condition

| Contact surface area | 2.0 cm$^2$ |
| --- | --- |
| Surface pressure | 0.5 kgf/cm$^2$ |
| Linear velocity | 15 cm/sec |

Test method (2) (against different material)

A plate specimen (50 mm×50 mm×3 mm (thickness)) was slided against a rod (5 mm$\phi$×5 mm) of stainless steel (SUS) using the Suzuki's testing machine under such conditions that a load was 10 kg and the linear velocity was 45 mm/sec for 24 hours, and the abrasion loss was determined.

Examples 1–8

A polyacetal resin (Duracon manufactured by Polyplastics, Ltd.: MI=9.0 g/10 minutes) was mixed with a polyethylene modified with maleic anhydride (B-1 or B-2), and a polyethyleneglycol di (aminopropyl) ether (C-1 or C-2) in a ratio-as shown in Table 1. They were melted and kneaded using a twin screw extruder having an inside diameter of 30 mm at a set temperature of 190° C. with a screw revolution of 80 rpm to prepare pellets. Next, specimens were prepared by molding the pellets with an injection molder and then the above-mentioned evaluations were carried out. Table 1 shows the results.

Comparative Examples 1–8

For the purpose of comparison, specimens were prepared by molding and evaluated in the same manners as those in Example 1, except that a polyacetal resin alone was used, or that a polyacetal resin with only one of a maleic anhydride-modified polyethylene and ethyleneglycol di (aminopropyl) ether, or with monoethanolamine (molecular weight 61), diisopropanol-amine (molecular weight 133) or a polyoxyethylene as a low-molecular-weight compound were used and blended each other at a ratio shown in Table 2. Table 2 shows the results.

Examples 9–10

Specimens were prepared by molding and evaluated in the same manners as those in Example 1, except that a maleic anhydride-modified polypropylene (B-3) or a maleic anhydride-modified ethylene-propylene copolymer (B-4) was blended therewith at a ratio shown in Table 3. Table 3 shows the results.

Examples 11–12

Specimens were prepared by molding and evaluated in the same manners as those in Example 1, except that in addition to components (A), (B) and (C), various lubricant as components (D) were further mixed therewith with at the ratios shown in Table 3. Table 3 shows the results.

Comparative Examples 9–10

For the purpose of comparison, specimens were prepared by molding and evaluated in the same manners as those in Example 1, except that a maleic anhydride-modified polypropylene or a maleic anhydride-modified ethylene-propylene copolymer was blended therewith at a ratio shown in Table 4. Table 4 shows the results.

Comparative Examples 11–14

For the purpose of comparison, specimens were prepared by molding and evaluated in the same manners as those in Example 1, except that component (D) was singly added thereto, or that component (D) was used together with component (B) or component (C). Table 4 shows the results.

TABLE 1

| | Unit | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Polyacetal resin (A) | pt. by wt. | 100 | 100 | 100 | 100 | 100 | 100 | 100 | 100 |
| Modified olefinic polymer (B) | pt. by wt. | B-1 | B-2 | B-2 | B-2 | B-2 | B-2 | B-2 | B-2 |
| | | 5 | 5 | 11 | 11 | 11 | 70 | 5 | 11 |
| Alkylene glycol Polymer (C) having an amino group(s) | pt. by wt. | C-1 | C-1 | C-1 | C-1 | C-1 | C-1 | C-1 | C-2 |
| | | 0.1 | 0.1 | 0.22 | 0.11 | 6.6 | 1.4 | 0.1 | 0.22 |
| Ratio of (C) to (B) | % by wt. | 2 | 2 | 2 | 1 | 60 | 2 | 2 | 2 |
| Other thermoplastic resin | kind | | | | | | | poly-ethylene | |
| | pt. by wt. | | | | | | | 6 | |
| Tensile strength | kgf/cm$^2$ | 513 | 510 | 449 | 452 | 414 | 340 | 438 | 443 |
| Tensile elongation | % | 38 | 89 | 95 | 63 | 110 | 36 | 42 | 102 |
| Peeling of surface | — | slightly | none | none | none | none | none | none | none |
| Elongation of specimen having weld portion | % | 25 | 42 | 37 | 22 | 48 | 20 | 29 | 38 |
| Test for friction Test method (1) Dynamic friction | | 0.24 | 0.26 | 0.23 | 0.23 | 0.25 | 0.22 | 0.23 | 0.23 |

TABLE 1-continued

|  |  | Unit | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| and abrasion |  | coefficient |  |  |  |  |  |  |  |  |
|  |  | Specific abrasiveness |  | 4.0 | 5.2 | 3.8 | 3.8 | 5.0 | 1.0 | 3.8 | 3.8 |
|  | Test method (2) | Abrasion loss | mg | 4.2 | 1.7 | 4.8 | 6.2 | 3.1 | 8.2 | 4.2 | 4.7 |

B-1: 0.1% maleic anhydride-modified polyethylene
B-2: 1% maleic anhydride modified polyethylene
C-1: Polyethyleneglycol di(aminopropyl) ether (Mw: 4000)
C-2: Polyethyleneglycol di(aminopropyl) ether (Mw: 10000)

TABLE 2

|  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Polyacetal resin (A) | pt. by wt. | 100 | 100 | 100 | 100 | 100 | 100 | 100 | 100 |
| Modified olefinic polymer (B) | pt. by wt. |  | B-2 5 | B-2 11 | B-2 70 |  | B-2 11 | B-2 11 | B-2 11 |
| Alkylene glycol polymer (C) having an amino group(s) | pt. by wt. |  |  |  |  | C-1 0.22 | C'-1 0.22 | C'-2 0.22 | C'-3 0.22 |
| Ratio of (C) or (C') to (B) | % by wt. |  |  |  |  |  | 2 | 2 | 2 |
| Tensile strength | kgf/cm² | 622 | 513 | 452 | 334 | 601 | 424 | 419 | 432 |
| Tensile elongation | % | 80 | 35 | 14 | 12 | 86 | 15 | 18 | 17 |
| Peeling of surface |  | none | peeling | peeling | peeling | none | peeling | peeling | peeling |
| Elongation of specimen having weld portion | % | 61 | 12 | 10 | 8 | 68 | 10 | 10 | 10 |
| Test for friction and abrasion | Test method (1) | Dynamic friction coefficient | 0.36 | 0.24 | 0.22 | 0.21 | 0.36 | 0.22 | 0.22 | 0.22 |
|  |  | Specific abrasiveness | 73 | 3.2 | 4.0 | 6.0 | 100 | 4.0 | 4.0 | 4.0 |
|  | Test method (2) | Abrasion loss | mg | 0.2 | 97 | 128 | 187 | 1.0 | 134 | 134 | 130 |

C'-1: monoethanolamine
C'-2: diisopropanolamine
C'-3: polyoxyethylene (Mw: 4000)

TABLE 3

|  | Unit | Ex. 9 | Ex. 10 | Ex. 11 | Ex. 12 |
|---|---|---|---|---|---|
| Polyacetal resin (A) | pt. by wt. | 100 | 100 | 100 | 100 |
| Modified olefinic polymer (B) | pt. by wt. | B-3 11 | B-4 11 | B-2 5 | B-2 5 |
| Alkylene glycol polymer (C) having an amino group(s) | pt. by wt. | C-1 0.11 | C-1 0.11 | C-1 0.1 | C-1 0.1 |
| Ratio of (C) to (B) | % by wt. | 1 | 1 | 2 | 2 |
| Lubricant (D) | kind | | | D-1 | D-2 |
|  | pt. by wt. | | | 2 | 2 |
| Tensile strength | kgf/cm² | 504 | 402 | 490 | 483 |
| Tensile elongation | % | 20 | 59 | 95 | 98 |
| Peeling of surface | — | none | none | none | none |
| Elongation of specimen having weld portion | % | 17 | 38 | 38 | 39 |
| Test for friction and abrasion | | | | | |
| Test method (1) | Dynamic friction coefficient | 0.30 | 0.29 | 0.18 | 0.17 |
|  | Specific abrasiveness | 7.8 | 7.0 | 0.8 | 0.6 |
| Test method (2) | Abrasion loss | mg | 7.2 | 6.6 | 8.3 | 9.8 |

B-3: 1% maleic anhydride-modified polypropylene
B-4: 1% maleic anhydride-modified ethylene-propylene copolymer
D-1: glycerol monostearate
D-2: stearyl stearate

TABLE 4

|  | Unit | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|
| Polyacetal resin (A) | pt. by wt. | 100 | 100 | 100 | 100 | 100 | 100 |
| Modified olefinic polymer (B) | pt. by wt. | B-3 11 | B-4 11 |  |  | B-2 5 |  |
| Alkylene glycol polymer (C) having an amino group(s) | pt. by wt. |  |  |  |  |  | C-1 0.1 |
| Ratio of (C) to (B) | % by wt. |  |  |  |  |  |  |
| Lubricant (D) | pt. by wt. |  |  | D-1 2 | D-2 2 | D-1 2 | D-1 2 |
| Tensile strength | kgf/cm² | 493 | 400 | 580 | 560 | 480 | 582 |
| Tensile elongation | % | 12 | 28 | 103 | 115 | 62 | 101 |
| Peeling of surface | — | peeling | peeling | slightly | slightly | peeling | slightly |
| Elongation of specimen having weld portion | % | 9 | 14 | 80 | 86 | 8 | 81 |
| Test for friction and abrasion  Test method (1)  Dynamic friction coefficient |  | 0.31 | 0.30 | 0.37 | 0.34 | 0.20 | 0.37 |
|  Specific abrasiveness |  | 7.8 | 7.0 | 70 | 62 | 1.2 | 75 |
|  Test method (2)  Abrasion loss | mg | 142 | 130 | 36 | 33 | 243 | 35 |

Examples 13–23

Specimens were prepared by molding and evaluated in the same manners as those in Example 1, except that a maleic anhydride-modified ethylene-ethyl acrylate copolymer or an acrylic acid-modified ethylene-ethyl acrylate copolymer as component (B) and, further, various lubricants as component (D) were blended thereto in such ratios as shown in Table 5. Table 5 shows the results.

TABLE 5

|  | Unit | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|
| Polyacetal resin (A) | pt. by wt. | 100 | 100 | 100 | 100 | 100 | 100 | 100 | 100 | 100 | 100 | 100 |
| Modified olefinic polymer (B) | pt. by wt. | B-5 5 | B-5 11 | B-6 5 | B-2 5 | B-3 5 | B-5 5 | B-5 5 | B-6 5 | B-5 5 | B-5 5 | B-5 5 |
| Alkylene glycol polymer (C) having an amino group(s) | pt. by wt. | C-1 0.2 | C-1 0.22 | C-1 0.2 | C-1 0.2 | C-1 0.2 | C-1 0.2 | C-1 0.2 | C-1 0.2 | C-1 0.2 | C-1 0.2 | C-1 0.2 |
| Ratio of (C) to (B) | % by wt. | 4 | 2 | 4 | 4 | 4 | 4 | 4 | 4 | 4 | 4 | 4 |
| Lubricant (D) | pt. by wt. |  |  |  | D-3 2 | D-4 2 | D-5 2 | D-6 2 | D-6 2 | D-3 D-6 1 1 | D-7 2 | D-8 2 |
| Tensile strength | kgf/cm² | 488 | 422 | 492 | 496 | 512 | 451 | 464 | 467 | 461 | 458 | 461 |
| Tensile elongation | % | 110 | >120 | 92 | 87 | 47 | 85 | 97 | 86 | 104 | 74 | 92 |
| Peeling of surface | — | none | none | none | none | none | none | none | none | none | none | none |
| Elongation of specimen having weld portion | % | 17 | 72 | 52 | 32 | 24 | 48 | 37 | 32 | 46 | 35 | 43 |
| Test for friction and abrasion  Test method (1)  Dynamic friction coefficient |  | 0.30 | 0.20 | 0.24 | 0.19 | 0.20 | 0.19 | 0.16 | 0.16 | 0.16 | 0.18 | 0.16 |
|  Specific abrasiveness |  | 7.8 | 5.2 | 6.2 | 0.9 | 2.8 | 1.8 | 0.8 | 0.9 | 0.9 | 1.0 | 1.3 |
|  Test method (2)  Abrasion loss | mg | 7.2 | 2.0 | 5.0 | 7.7 | 4.1 | 1.8 | 1.7 | 1.9 | 1.5 | 5.2 | 1.8 |

B-5: 2% maleic anhydride-modified ethylene-ethyl acrylate copolymer
B-6: 1% acrylic acid-modified ethylene-ethyl acrylate copolymer
D-3: paraffin (average molecular weight: 750)
D-4: polyglycerol (average molecular weight: 1000)
D-5: poly(dimethylsiloxane) (average molecular weight: 18000)
D-6: tridecyl stearate
D-7: α-olefinic olygomer (average molecular weight: 1000)
D-8: alkyl($C_{18}$)-substituted diphenylether (mfd. by Matmura Petrochemical Research Laboratories Co. Ltd.)

Comparative Examples 15–21

For the purpose of comparison, specimens were prepared by molding and evaluated in the same manners as those in Example 1, except that component (B) or component (C) was singly added thereto. Table 6 shows the results.

TABLE 6

|  | Unit | Comp. Ex. 15 | Comp. Ex. 16 | Comp. Ex. 17 | Comp. Ex. 18 | Comp. Ex. 19 | Comp. Ex. 20 | Comp. Ex. 21 |
|---|---|---|---|---|---|---|---|---|
| Polyacetal resin (A) | pt. by wt. | 100 | 100 | 100 | 100 | 100 | 100 | 100 |
| Modified olefinic polymer (B) | pt. by wt. | B-5 5 | | | | | | |
| Alkylene glycol polymer (C) having an amino group(s) | pt. by wt. | | | | | | | |
| Lubricant (D) | pt. by wt. | | D-3 2 | D-4 2 | D-5 2 | D-6 2 | D-7 2 | D-8 2 |
| Tensile strength | kgf/cm$^2$ | 481 | 577 | 567 | 568 | 572 | 570 | 563 |
| Tensile elongation | % | 39 | 85 | 66 | 79 | 52 | 80 | 43 |
| Peeling of surface | — | peeling | peeling | peeling | slightly | slightly | peeling | slightly |
| Elongation of specimen having weld portion | % | 15 | 44 | 36 | 69 | 60 | 41 | 36 |
| Test for friction and abrasion — Test method (1) — Dynamic friction coefficient | | 0.27 | 0.35 | 0.38 | 0.33 | 0.31 | 0.34 | 0.39 |
| Specific abrasiveness | | 3.8 | 74 | 80 | 63 | 64 | 62 | 42 |
| Test method (2) — Abrasion loss | mg | 105 | 31 | 37 | 28 | 30 | 35 | 42 |

We claim:

1. A polyacetal resin composition prepared by melting a polyacetal resin (A), a modified olefinic polymer (B) modified with at least one member selected from the group consisting of an unsaturated carboxylic acid and an acid anhydride thereof, and their derivatives, and an alkylene glycol polymer (C) having a primary or secondary amino group(s) and having a number-average molecular weight of 400 to 500,000, and kneading them each other, wherein component (B) is contained in an amount of 1 to 100 parts by weight based on 100 parts by weight of component (A), and component (C) is contained in an amount of 0.1 to 100% by weight based on component (B).

2. The polyacetal resin composition as described in claim 1, wherein the modified olefinic polymer modified with at least one member selected from the group consisting of an unsaturated carboxylic acid and an acid anhydride thereof, and their derivatives as component (B) is one prepared by modifying 100 parts by weight of an olefinic polymer (b) with 0.1 to 20 parts by weight of maleic anhydride.

3. The polyacetal resin composition as claimed in claim 2, wherein the olefinic polymer (b) is a polymer mainly comprising ethylene and/or propylene.

4. The polyacetal resin composition as claimed in claim 2, wherein the olefinic polymer (b) is a polyethylene.

5. The polyacetal resin composition as claimed in claim 2, wherein the olefinic polymer (b) is an ethylene-ethyl acrylate copolymer or an ethylene-methyl acrylate copolymer.

6. The polyacetal resin composition as claimed in claim 1, which is prepared by blending, further, a lubricant (D) in an amount of 0.1 to 20 parts by weight based on 100 parts by weight of the sum total of components (A), (B) and (C).

7. The polyacetal resin composition as claimed in claim 6, wherein the lubricant (D) is at least one member selected from the group consisting of a silicone, an α-olefinic oligomer, a paraffin, a substituted diphenyl ether, a derivative of a fatty acid having 10 or more carbon atoms, and a derivative of an aliphatic alcohol having 10 or more carbon atoms.

8. The polyacetal resin composition as claimed in claim 7, wherein the silicone as the lubricant (D) is a poly(dimethylsiloxane) or a poly(methylphenylsiloxane) of which the kinetic viscosity (25° C.) is in a range of from 100 to 100,000 cSt.

9. The polyacetal resin composition as claimed in claim 7, wherein the α-olefinic oligomer as the lubricant (D) is an α-olefinic oligomer and/or an ethylene • α-olefinic oligomer of which the average molecular weight(s) is(are) from 400 to 4,000.

10. The polyacetal resin composition as claimed in claim 7, wherein the paraffin as the lubricant (D) is a paraffin having an average molecular weight of 300 to 800.

11. The polyacetal resin composition as claimed in claim 7, wherein the substituted diphenyl ether as the lubricant (D) is a compound comprising a phenyl group and, introduced thereinto, at least one member selected from the group consisting of an alkyl group, an ester group and an acyl group of which carbon atom number is 12 or more.

12. The polyacetal resin composition as claimed in claim 7, wherein the derivative of a fatty acid having 10 or more carbon atoms as the lubricant (D) is an ester of a fatty acid having 10 or more carbon atoms with a monovalent or polyvalent aliphatic and/or aromatic alcohol having 10 or more carbon atoms, or is an amide of a fatty acid having 10 or more carbon atoms with a primary, secondary or tertiary amine.

13. The polyacetal resin composition as claimed in claim 7, wherein the derivative of an aliphatic alcohol having 10 or more carbon atoms as the lubricant (D) is an ester of an aliphatic alcohol having 10 or more carbon atoms with a monovalent or polyvalent aliphatic and/or aromatic carboxylic acid having 10 or more carbon atoms.

14. A slide member comprising the polyacetal resin composition as described in claim 1.

* * * * *